(12) United States Patent
Brunson

(10) Patent No.: US 8,767,934 B2
(45) Date of Patent: Jul. 1, 2014

(54) ASSOCIATING A TOPIC WITH A TELECOMMUNICATIONS ADDRESS

(75) Inventor: Gordon R. Brunson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 1453 days.

(21) Appl. No.: 12/203,440

(22) Filed: Sep. 3, 2008

(65) Prior Publication Data

US 2010/0054444 A1 Mar. 4, 2010

(51) Int. Cl.
*H04M 3/42* (2006.01)

(52) U.S. Cl.
USPC ............... 379/201.12; 379/88.25; 379/198; 379/201.01

(58) Field of Classification Search
USPC ......... 379/201.01–201.08, 88.22–88.26, 198, 379/201.12; 370/352–354
See application file for complete search history.

(56) References Cited

U.S. PATENT DOCUMENTS

| | | | |
|---|---|---|---|
| 5,905,792 A * | 5/1999 | Miloslavsky | 379/265.11 |
| 6,766,007 B1 * | 7/2004 | Dermler et al. | 379/201.01 |
| 7,729,342 B1 * | 6/2010 | Satish et al. | 370/352 |
| 2008/0212759 A1 * | 9/2008 | Bates | 379/207.15 |
| 2009/0310765 A1 * | 12/2009 | Denny et al. | 379/142.15 |

OTHER PUBLICATIONS

Numbr, LLC; "Tracking Numbers"; http://numbr.com/solutions.html; Copyright 2006-2008; 2 pages.
David Berlind; "The Pros and Cons of Temporary Phone No. Services"; http://blogs.zdnet.com/BTL/?p=3892; Nov. 7, 2006; 7 pages.
Itellas LLC; "Caller ID Spoofing"; http://www.itellas.com/callerIDSpoofing.php; Copyright 2007; 2 pages.
Whirlwind Software; "S.O.B—Software Orange Box 1.9; Caller ID Generator for Windows Originally Written by the Fixer"; http://artothacking.com/SOBREAD.TXT; Copyright 2003; 4 pages.

* cited by examiner

Primary Examiner — Oleg Asanbayev

(57) ABSTRACT

A topic is associated with a temporary communications address such as a temporary telephone number. This assignment may be effected by the user when the temporary address is obtained by the user. Illustratively, a user who simultaneously uses a plurality of temporary addresses associates a different topic with each of those addresses. When a caller calls the temporary address, the call is redirected to the user's real address and the user receives the topic that is associated with that temporary address, and preferably also the called temporary address itself, along with the redirected call, and this information is either displayed or announced to the user. The information provides context for the call to the user, and may optionally be captured in call logs. Illustratively, when the user initiates a call via the temporary address or the topic, the temporary address or the topic is provided to the called party as the caller ID information. The user's identity is thus kept secret. The user may select the calling topic or temporary address from a display of the call logs of past calls that involved the topics and temporary addresses associated with the user's real address.

10 Claims, 4 Drawing Sheets

| 202 — TEMPORARY NUMBER | TOPIC DISPLAY | TOPIC AUDIO | REAL NUMBER |
|---|---|---|---|
| 210 | 212 | 214 | 216 |
| • | • | • | • |

— 200

ASSOCIATING A TOPIC WITH A TELECOMMUNICATIONS ADDRESS

TECHNICAL FIELD

This invention relates to telecommunications.

BACKGROUND OF THE INVENTION

Temporary telephone numbers are numbers that are assigned to users for use for a limited period of time. There are websites that, for a fee, provide these temporary telephone numbers to users who wish to preserve their privacy by keeping their real telephone numbers secret. The temporary telephone numbers are popular with a wide variety of users, such as eBay sellers, people using dating services, business running temporary ad campaigns, etc. Instead of giving out their real telephone number, a user gives out the temporary telephone number to parties that may want to contact the user. When a call is made to the temporary telephone number, it is forwarded to the user's actual telephone number or mailbox. When the user does not need the temporary telephone number anymore, they "disconnect" it by ceasing to pay for it.

The forwarded call may be accompanied by calling number identification, which indicates the telephone number or identity of the caller. But no indication is given to the called party that the call was made to their temporary number as opposed to directly to their real telephone number. This problem is compounded for users who use a plurality of temporary telephone numbers simultaneously, such as a business that uses a different temporary number for each different ad campaign. Such a user is given no indication of which one of the temporary numbers a caller had called.

Dialed Number Identification Service (DNIS) is a service sold by telephone companies to corporate clients that lets them know which telephone number was dialed by a customer. The telecommunications company sends a DNIS number to the client's phone system during the call setup. But DNIS forwarding is traditionally done for a fee, requires specific network attachment gear, and can only be done at the last hop of the call when the call is being sent from the public network to a private PBX. Without SIP, there is no easy mechanism to signal the additional information to the endpoints.

The Vector Directory Number (VDN) of Origin Announcement (VOA) service of the Communications Manager (CM) Call Center from Avaya Inc. provides agents with a short (1.5 seconds or less) announcement about a caller's city of origin or requested service based on VDN used to process the call. The VOA is a recorded announcement that is played (or the II digits are displayed) to the call center agent after the zip tone but just before a call is cut through to the agent. This allows agents on any phone to know information about the call. The VOA is recorded and adminstered as part of the call center set-up. The VOA can be recorded based on a service, and then it is associated with a VDN to announce the service associated with the DNIS. All of this is done by an administrator through the CM administration pages. So CM takes the DNIS number dialed by the calling party, that number is translated to a VDN, and the associated announcement, if any, is played to the agent. CM uses the II digits to display information regarding the caller's city of origin. For example, the administration can assign priority to emergency services if the II digits indicate that the caller is calling from a pay phone or a mobile phone. Or, one can flag a call that comes in from a prison/detention center. The II digit standard are found at: http://www.nanpa.com/number_resource_info/ani_ii_assignments.html. For example, for the number "1-800 Flowers", a VDN can be based on the DNIS for 1-800 Flowers—the number that was originally dialed—and a VOA can be associated with the VDN. So if one dials 1-800 Flowers, there is a VDN just for this telephone number. Then the associated VOA is, for example, "1-800 Flowers/II digits." So the call center agent hears or sees "1-800 Flowers/call from mobile phone.

SUMMARY OF THE INVENTION

According to an aspect of the invention, a topic is associated with a temporary communications address such as a temporary telephone number. This assignment may be effected by the user when the temporary address is obtained by the user. Illustratively, a user who simultaneously uses a plurality of temporary addresses associates a different topic with each of those addresses. When a caller calls the temporary address, the call is redirected to the user's real address and the user receives the topic that is associated with that temporary address, and preferably also the called temporary address itself, along with the redirected call, and this information is either displayed or announced to the user. Preferably, (caller ID) information, if available, is also received with the redirected call and provided to the user. The information provides context for the call to the user, and may optionally be captured in call logs. Illustratively, when the user initiates a call via the temporary address or the topic, the temporary address or the topic is provided to the called party as the caller ID information. The user's identity is thus kept secret. The user may select the calling topic or temporary address from a display of the call logs of past calls that involved the topics and temporary addresses associated with the user's real address, or from a "get new temporary number" screen or dialog.

According to a first aspect of the invention, a topic is associated with a temporary address that is associated with a real address. In response to a communication addressed to the temporary address, the communication is directed to the associated real address and the associated topic is provided to the real address.

According to a second aspect of the invention, a topic is associated with a temporary address that is associated with a real address. In response to identifying a called party and at least one of the temporary address and the topic, a communication is effected with the called party, at least one of the topic and the temporary address is provided to the called party, despite the fact that the communication originated from to the real address.

The invention may be implemented both as a method and an apparatus, as well as a computer-readable medium containing instructions which, when executed by a computer, cause the computer to perform the method.

DETAILED DESCRIPTION

Figure 1:
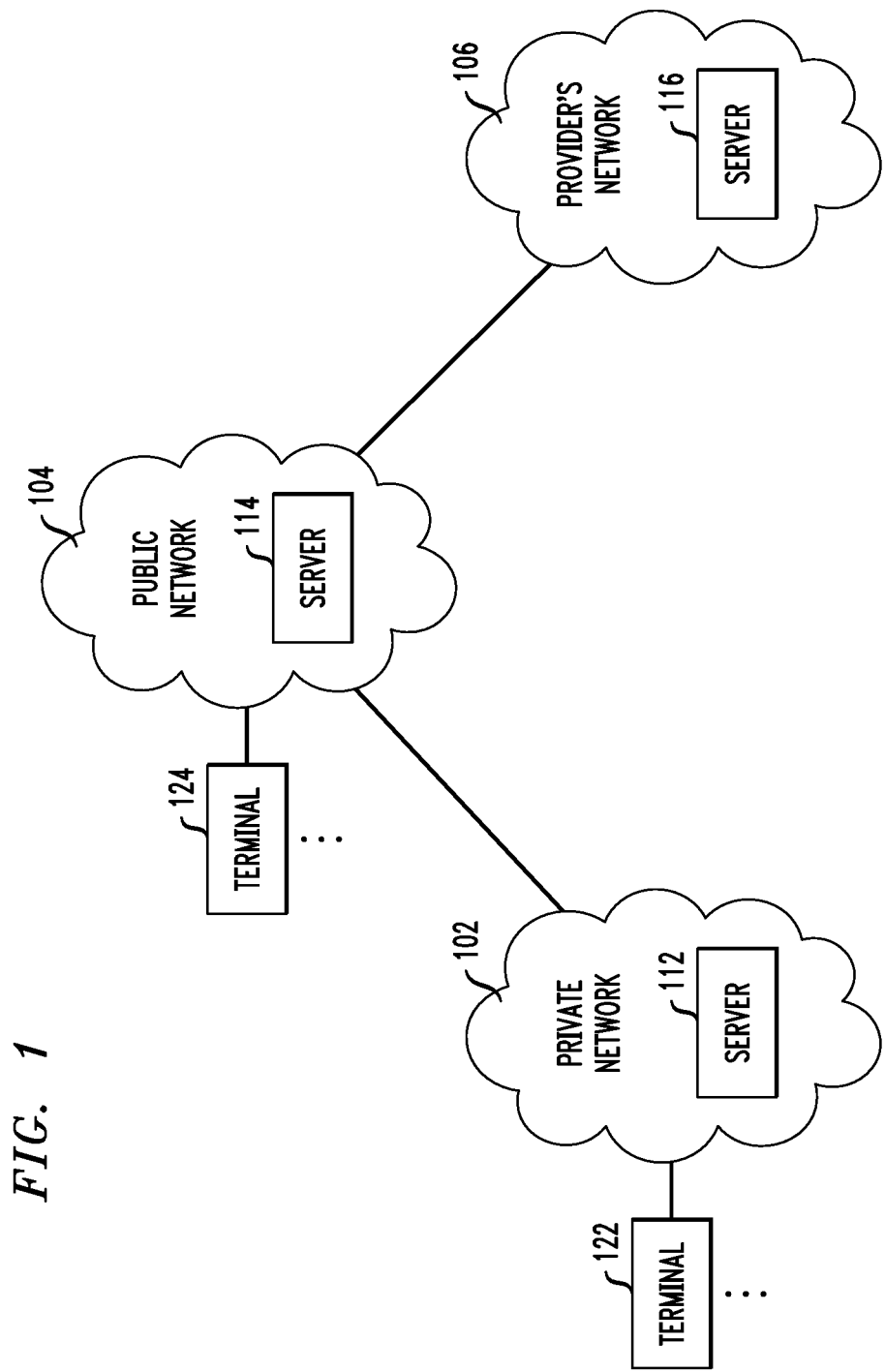
FIG. 1 is block diagram of a communications system that includes an illustrative embodiment of the invention.

FIG. 1 shows a communications system comprising a plurality of user terminals 122-124 interconnected by a plurality of interconnected communications networks 102-106. Illustratively, terminals 122 are a part of (are directly connected to and served by) a private network 102, and terminals 124 are a part of public network 104. Networks 102-106 are any desired communications networks. For example, network 102 or 106 is illustratively the internal communications network of an enterprise or an organization, such as a private-branch exchange (PBX)-based telephony network or a local area network (LAN), and network 104 is illustratively the public service telephone network (PSTN) or a wide area network (WAN) such as the Internet. Terminals 122 and 124 are any desired communications terminals, such as wired or wireless telephones, voice over Internet Protocol (VoIP) terminals, computer-implemented softphones, voice- or text-messaging terminals, web browser-equipped devices, etc.

In the communication system of FIG. 1, temporary addresses such as temporary telephone numbers may be provided by one or more servers 112-116 in any one or more networks 102-106, in a conventional manner. Illustratively, temporary addresses may be provided to terminals 122 by a server 112 in network 102; may be provided to terminals 122 or 124 by a server 114 in network 104; and be provided to terminals 122 or 124 by a server 116 in network 106 of a commercial provider of temporary addresses. Servers 112-116 may take any desired form, such as an application server module in a telephony switch, an adjunct processor to a telephony switch, a feature server, a gateway, a web server, etc. Illustratively, each server 112-116 is a stored-program controlled entity, such as a computer, that includes a store of programs and data and a processor for executing the programs and generating or using the data. The types of terminals 122-124, networks 102-106, and servers 112-116 that are employed are irrelevant for purposes of this invention.

As described so far, the communications system of FIG. 1 is conventional.

Figure 2:
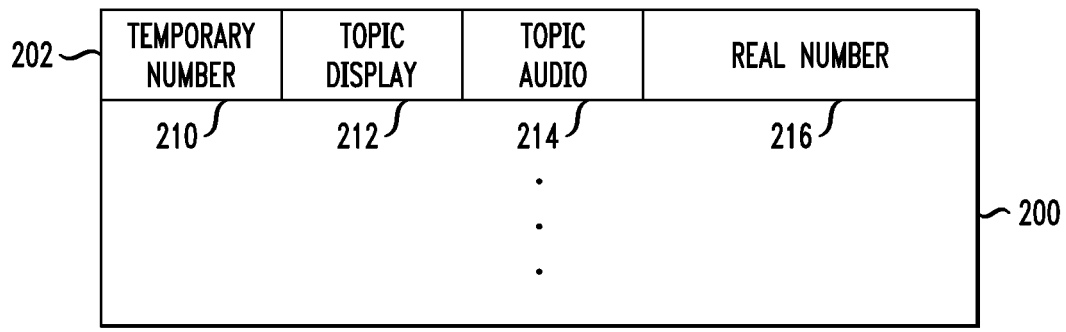
FIG. 2 is a block diagram of a repository of information about temporary numbers in the system of FIG. 1.

According to an aspect of the invention, topics may be associated with temporary numbers by the present assignees of those numbers. A topic can be any desired information. Typically, it is a descriptor of the use to which the assignee is putting the temporary number. A server 112-116 that is providing temporary telephone numbers or other temporary addresses has a repository 200—a database, a table, or some other form of a storage entity—shown in FIG. 2, that contains one or more records 202 each for a corresponding temporary number that has been issued to users of terminals 122-124. Each record 202 includes a field 210 for the temporary number or other temporary address, a field 216 for the real telephone number or other real address with which the temporary number is presently associated, a field 212 for display information, such as text, representing a topic that the present assignee of the temporary number has associated with the temporary number, and a field 214 for audio information representing the topic. Illustratively, both fields 212 or 214 may be provided and/or populated with information. Contents of fields 212-216 are dynamic in that they change with each reassignment of the corresponding temporary number.

Figure 3:
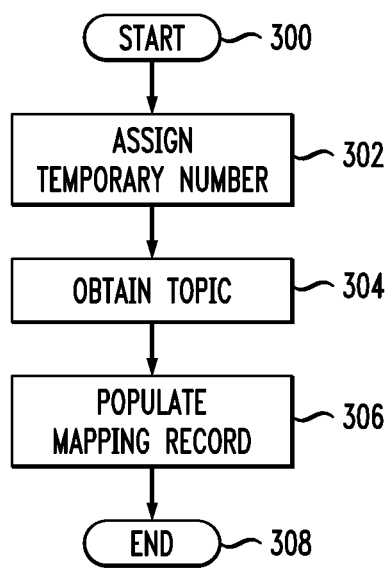
FIG. 3 is a functional flow diagram of a procedure for associating a topic with a temporary number in the system of FIG. 1.

FIG. 3 shows an illustrative procedure for obtaining a temporary number and associating a topic therewith. A user of a terminal 122-124 contacts a provider of temporary numbers, at step 300, and obtains one or more temporary numbers from a server 112-116 in a conventional manner, at step 302. The user is also prompted to provide a topic to associate with each assigned temporary number in a display (e.g., text) form and/or in audio (e.g., spoken) form, at step 304. The obtained topic is entered into fields 212 and/or 214 by server 112-116, at step 306. The procedure then ends, at step 308.

Figure 4:
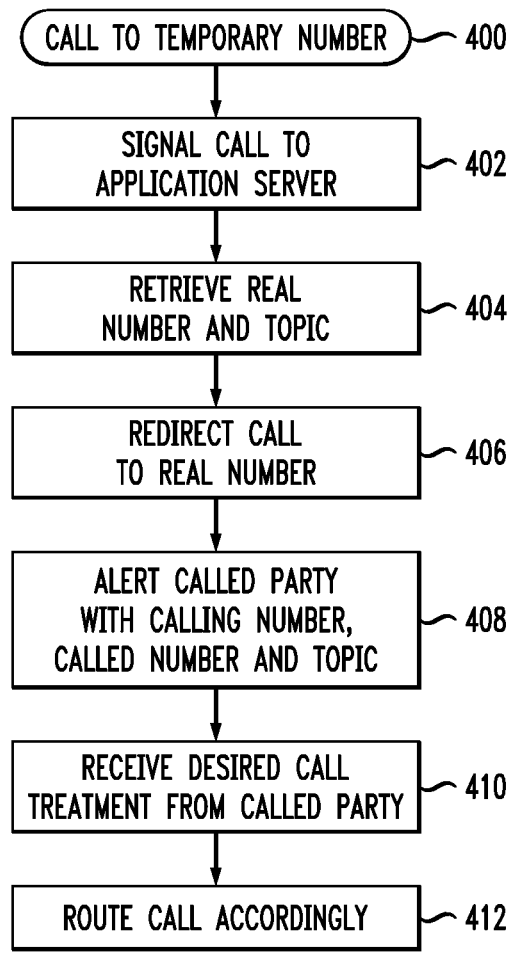
FIG. 4 is a functional flow diagram of processing a call to a temporary number in the system of FIG. 1.

FIG. 4 shows an illustrative procedure that is performed in response to a call to the temporary number. When a terminal 122 attempts to communicate with a temporary address, e.g., calls the temporary number, at step 400, network 102 recognizes whether the address belongs to an in-network entity, e.g., server 112, or to an out-of-network entity, and signals the attempt accordingly, at step 402, either to server 112 or to public network 104. If the attempt is signaled to network 104, network 104 likewise recognizes whether the address belongs to an in-network entity, e.g., server 114, or to an out-of-network entity, e.g., network 106, and signals the attempt accordingly, at step 402, either to server 114 or to network 106. Network 104 treats an attempt by a terminal 124 to communicate with a temporary number in the same manner. If the attempt is signaled to network 106, network 106 recognizes that the address belongs to server 116 and signals the attempt to server 116, at step 402.

Whichever server 112-116 owns the temporary address (the "owning server") accesses the address' corresponding record 202 in storage 200 to obtain the contents, if any, of fields 212-216, at step 404. If field 216 is empty, the temporary number is currently unassigned and so the communication attempt fails. If field 216 contains a real address, owning server 112-116 provides the real number to owning network 102-106 to establish a communication between the calling terminal 122 and the called terminal 124, at step 406, without disclosing the real identity of the called party. Server 112-116 also provides any contents of fields 212-214 of the temporary address' record 202 to owning network 102-106 to be used in contacting the real terminal. According to an aspect of the invention, as part of establishing the communication with the called terminal 122 or 124, network 102 or 104 provides those contents to the called terminal, at step 408, prior to completing the connection with the calling terminal. For example, the network sends fields 212-214 to the called terminal as a part of alerting the called party of the call. The called terminal provides the information to the called party. For example, contents of field 212 are displayed on the display screen of the called telephone, softphone, or computer, or the contents of field 214 are played out in audio form at a speaker (e.g., handset) of the called telephone, or the contents of field 214 are sent to an audio module of the called computer in a pre-cut-through call step, at step 408. Context for the attempted communication is thus provided to the called party prior to completing the call. Illustratively, this context enables the called party to give particular treatment to the call; for example, to decide whether or not to accept the communication—e.g., answer the call—or to accept the communication in a particular manner—e.g., to pick up the call and identify itself in a particular matter—or redirect the call to coverage such as to a voice mail system, etc., at step 410. The call is then routed accordingly, at step 412.

According to another aspect of the invention, when originating a communication, e.g., making a call, a user of a terminal 122-124 that has one or more temporary addresses associated therewith can have the communication identified to the called terminal as originating with one of the temporary addresses as opposed to the originating terminal's real address. For example, a user of a terminal 122-124 may initiate a communication to the called party by providing the address of the called party along with a feature access code that causes server 112 or 114 to interact with the calling user to determine which temporary address the user wants to have provided to the called party as the originating address. Or, the calling user may establish a communication—e.g., a call or a web session—with server 116 and interact with server 116 to cause server 116 to establish a communication between the calling terminal and the called terminal and give the called terminal the caller's temporary address as the calling address. The anonymity of the caller's real identity (i.e., the real number) is thus preserved.

Figure 5:
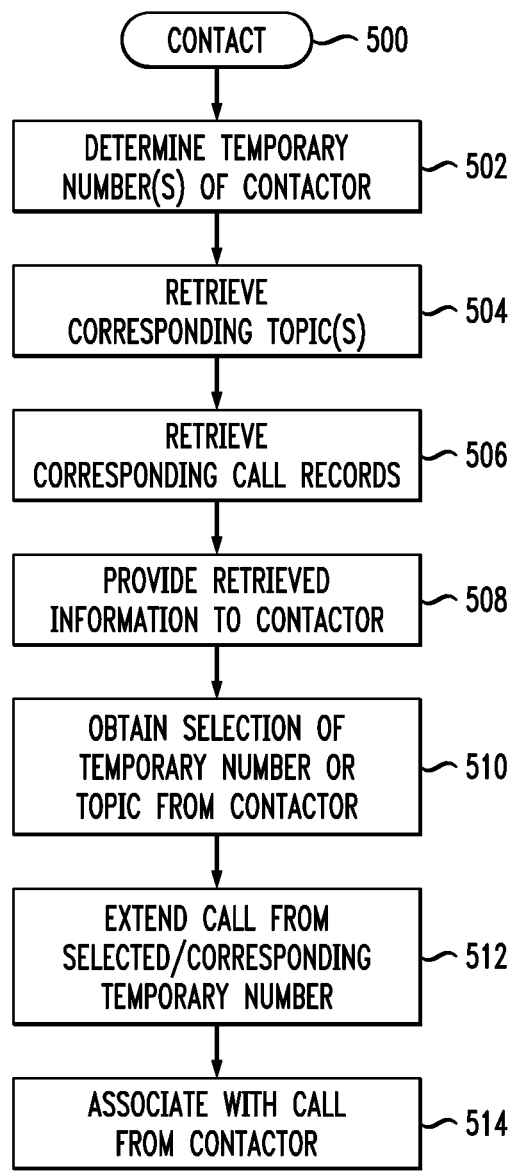
FIG. 5 is a functional flow diagram of processing a call from a temporary number in the system of FIG. 1.

FIG. 5 shows an illustrative example of this procedure. The calling party contacts the provider of temporary numbers, at step 500. The provider's server 112-116 determines the temporary number or numbers that are associated with the contact, at step 502. Server 112-116 retrieves from its records 200 the corresponding topic or topics, at step 504. Server 112-116 also retrieves its corresponding network's records of calls that have been made to and/or from these temporary numbers, at step 506. The retrieved information is provided to the contactor, at step 508. For example, the information is displayed to the contactor on a display of its terminal 122-124. The contactor selects one of the topics and signals its selection to server 112-116, at step 510. In response, server 112-116 causes a call to be extended to the called party from the selected topic's corresponding temporary number, at step 512. Alternatively, the contactor may select one of its temporary numbers, and the server causes a call to be extended from the selected number. In either case, alerting of the called party identifies the call as originating at the temporary number and not as originating at the contactor's real number. Server 112-116 associates the extended call with the calling party's (contactor's) terminal 122-124, at step 514, thereby connecting the contactor with the called party.

Of course, various changes and modifications to the illustrative embodiment described above will be apparent to those skilled in the art. For example, this mechanism may be invoked via remembering recently-placed calls which have used the temporary number, and triggering any new call attempt to that number that is not using the temporary number as the originating number. The id can either be substituted automatically, or the calling party can be prompted for the opportunity to use the temporary number in place of the real number. Also, usability may be improved by having the temporary number prominently displayed to the owner during any call in which it is being used. Thus, if asked for the call-back number, the temporary number may be easily recited. Furthermore, the way temporary numbers are retired and aged before being allowed to go back into service might dynamically affect temporary numbers stored in call logs, wherein the temporary numbers need to display and expire their verility so that an expired and possibly-reassigned temporary number does not get used accidentally in single-click dialing from a call log. These changes and modifications can be made without departing from the spirit and the scope of the invention and without diminishing its attendant advantages. It is therefore intended that such changes and modifications be covered by the following claims except insofar as limited by the prior art.

What is claimed is:

1. A method comprising:
associating, by an assignee in a server, a plurality of different topics with a plurality of different temporary addresses that are associated with a real address;
storing, by the server in a database one or more records of communication, wherein each record of the one or more records of communication includes a topic of the plurality of different topics, a temporary address of the plurality of different temporary addresses, and the real address associated with each other by the assignee;
in the server, in response to a caller providing the real address and a feature access code to the server:
retrieving and providing to the caller the one or more records of communications that display in a table the plurality of different topics and the plurality of different temporary addresses that are associated with the real address; and
in response to the caller selecting one of (a) one of the plurality of different topics and (b) one of the plurality of different temporary addresses, providing the selected one of the topics and the associated one of the temporary addresses to a called party and effecting an outbound communication between the called party and the caller, wherein the called party is prevented from seeing the real address; and
in the server, in response to the server receiving an incoming communication addressed to the temporary address of the plurality of different temporary addresses:
determining, by the server, the real address by matching the temporary address in the database to the stored associations;
directing, by the server, the incoming communication to the real address previously associated by the assignee to the temporary address, and
providing the topic of the plurality of different topics associated with the temporary address to a terminal of a user at the real address.

2. The method of claim 1 further comprising:
connecting the directed communication to a communications terminal associated with the real address; and
the terminal indicating the provided topic to a user.

3. The method of claim 1 wherein:
the temporary address comprises a temporary telephone number.

4. The method of claim 3 wherein:
The communication is a call.

5. A non-transitory computer-readable storage medium storing instructions which, when executed by a server, cause the server to perform the method of one of claims 1-2.

6. An apparatus comprising:
a store for storing in a database one or more records of communication, wherein each record of the one or more records of communication includes a topic of a plurality of different topics, a temporary address of a plurality of different temporary addresses, and a real address associated with each other by an assignee;
a server responsive to a caller providing the real address and a feature access code, for retrieving and providing to the caller the one or more records of communications that display in a table the plurality of different topics and the plurality of different temporary addresses that are associated with the real address;
the server responsive to the caller selecting one of (a) one of the plurality of different topics and (b) one of the plurality of different temporary addresses, for providing the selected one of the topics and the associated one of the temporary addresses to a called party and effecting an outbound communication between the called party and the caller, wherein the called party is prevented from seeing the real address; and
the server responsive to receiving an incoming communication addressed to the temporary address of the plurality of different temporary addresses, for determining the real address by matching the temporary address in the database to the stored associations, directing the incoming communication to the real address previously associated by the assignee to the temporary address, and providing the topic of the plurality of different topics associated with the temporary address to a terminal of a user at the real address.

7. The apparatus of claim 6 wherein:
the server is adapted to direct the communication to the associated real address and to provide the associated topic to the real address via a communications network.

8. The apparatus of claim 6 wherein:
the temporary address comprises a temporary phone number.

9. The apparatus of claim 8 wherein:
the communication is a call.

10. The apparatus of claim 6 further comprising:
a communications terminal associated with the real address, for receiving the directed communication and the associated topic and forwarding the received topic to a user.

* * * * *